Jan. 27, 1953     I. R. VERSOY     2,626,625
VALVE STRUCTURE

Filed Nov. 11, 1944     2 SHEETS—SHEET 1

Inventor
Irving R. Versoy
By Rockwell-Bartholow
Attorneys

Jan. 27, 1953     I. R. VERSOY     2,626,625
VALVE STRUCTURE

Filed Nov. 11, 1944     2 SHEETS—SHEET 2

Inventor
Irving R. Versoy
By Rockwell & Bartholow
Attorneys

Patented Jan. 27, 1953

2,626,625

UNITED STATES PATENT OFFICE 2,626,625

VALVE STRUCTURE

Irving R. Versoy, New Haven, Conn., assignor to The Berger Brothers Company, New Haven, Conn., a corporation of Connecticut Application November 11, 1944, Serial No. 562,945

4 Claims. (Cl. 137—38)

This invention relates to a valve structure and more specifically to a valve for controlling fluid such as gases, for example.

As illustrated and described, my invention is applied to a gravity-operated valve structure for use in controlling the admission of air to suits worn by aviators to prevent the injurious effects resulting to the pilot or passengers from the sudden changes in the speed and direction of an airplane. It will be understood, however, that the principles of the invention are not to be limited to this use but may be employed in other relations. The present description merely serves to illustrate and disclose one preferred use of the invention.

It is well known that sudden changes in the speed and direction of an airplane, and particularly changes in direction, such as that which occurs when an airplane is brought out of a dive, bring about injurious effects to the pilot or passengers of the plane, and it has been proposed to protect such passengers by the use of suits worn by them, which will be provided with inflatable bladders or the like to which air may be admitted to exert pressure upon certain parts of the body. It is desirable that this pressure be exerted only when necessary and that the bladders normally be in deflated condition. However, as it would be inconvenient for the pilot of a plane, for example, to attend to the inflation and deflation of such bladders at the proper time, it is desirable that this be taken care of automatically.

The present invention pertains to a valve structure to accomplish automatically the inflation and deflation of an aviator's suit from a source of compressed air, for example, the arrangement being such that due to an increase in centrifugal force or an increase of the force exerted by gravity, the supply of compressed air will be admitted to the aviator's suit without any attention on the part of the aviator himself. Also, provision is made for the venting of the suit when the need for the inflation thereof is no longer present.

One object of my invention is to provide a valve structure for controlling the passage of a fluid therethrough of such character that the valve or valves controlling such passage may be actuated by centrifugal force.

A still further object of my invention is to provide a valve structure of the character described, such that the controlling valve or valves will be responsive to an increase in the pull or force of gravity, responsive in turn to centrifugal force whereby the valve or valves will be automatically moved from open to closed position or vice versa depending upon the centrifugal force to which the structure is subjected.

A still further object of my invention is to provide a valve structure of the character described, the controlling valve or valves being arranged to stand normally in a given position, but which are adapted to be moved from this position by the action of centrifugal force.

Still another object of the invention is to provide a valve structure designed to control the admission of fluid pressure such as compressed air, for example, to an aviator's suit or the like, the control being effected automatically to bring about the inflation of the suit when desired, and also to control the degree of inflation of the suit or the degree of pressure of the air admitted to the suit.

To these and other ends the invention relates to the novel features and combinations of parts to be hereinafter described and claimed.

Figure 1:
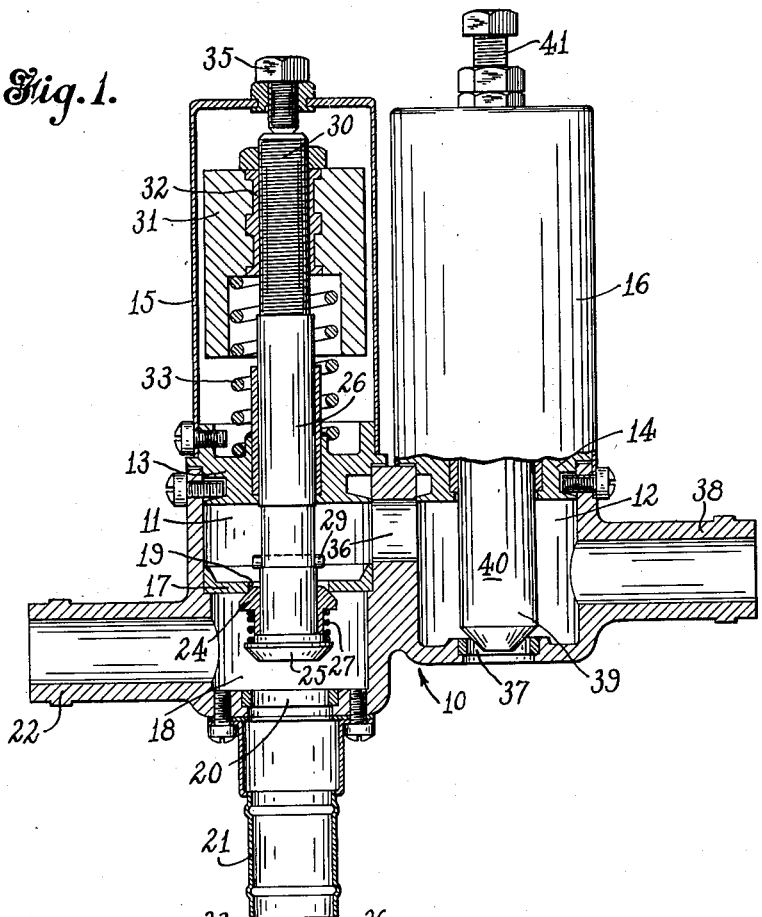
Fig. 1 is a sectional view of a valve structure embodying my invention.
Figure 2:
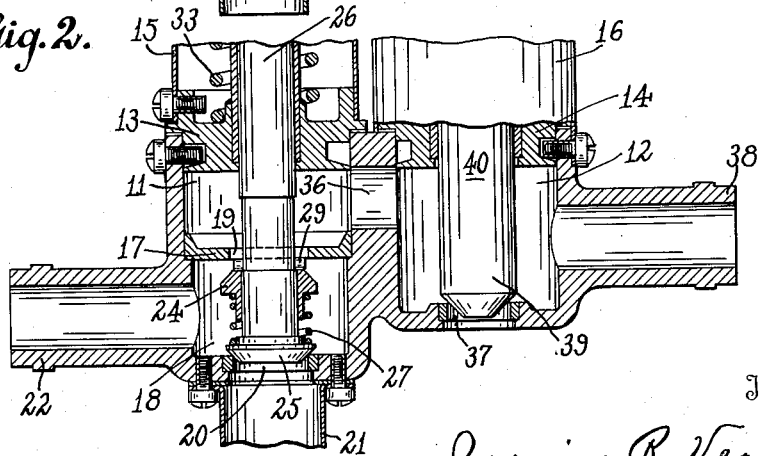
Fig. 2 is a view similar to Fig. 1 showing certain of the valves in a different position.

In Figs. 1 and 2 of the drawings, I have disclosed, as an illustration of a preferred embodiment of my invention, a valve casing designated generally by the numeral 10, the casing being provided with chambers 11 and 12. Above these chambers are partitions 13 and 14 upon which are supported sealing caps 15 and 16.

The chamber 11 is separated by a partition 17 from a lower chamber 18, the partition 17 having provided therein a port 19 providing communication between the chambers 11 and 18.

A second port 20 is provided at the lower portion of the chamber 18, this port as shown being in alignment with the port 19, and from the port 20 leads a pipe or duct 21. This pipe may lead to any place where it is desired to convey fluid pressure, or may lead directly to the atmosphere if it is merely desired to vent the chamber 18. However, in the form of my invention shown, it will be assumed that the duct 21 leads to the gas tank of an airplane, for example, to pressurize or put under pressure the gas in the tank.

Inlet means in the form of a pipe 22 are provided for the chamber 18, it being understood that fluid such as air, for example, under pressure will be admitted to the chamber 18 through such inlet. The ports 19 and 20 constitute the outlets for the chamber 18, these ports being controlled, respectively, by valves 24 and 25. The valve 25 is secured to the lower end of a stem 26, while the valve 24 is slidably mounted upon this stem and is urged toward the port 19 or away from the valve 25 by a spring 27 acting at its upper end against the valve 24 and at its lower end against the valve 25. It will be seen, therefore, that the spring 27 normally tends to hold the valve 24 against its seat in the partition 17 closing the port 19.

An abutment in the form of a pin 29 is secured to the stem 26 above the valve 24, which abutment is adapted to pass through the port 19 and engage the valve 24 when the stem is moved downwardly from the position shown in Fig. 1, and move this valve from its seat to open the port 19, as shown in Fig. 2.

The valve stem 26 also extends upwardly through the partition 13 into the cap 15, and its upper end is screw-threaded, as shown at 30. A weight 31 secured to a sleeve 32 is adjustably mounted on the stem 26 by means of the sleeve 32 being threadingly engaged with the threads 30 of the valve stem. Acting between the weight 31 and the partition 13 is a compression spring 33 normally urging the valve stem 26 upwardly as shown in the drawings, so as to maintain the valve 25 away from its seat in the lower end of the chamber 18, and therefore maintain the port 20 in open position. The tension of this spring may be adjusted by adjustment of the weight 31 on the threaded end of the stem. A stop screw 35 may be adjustably mounted at the upper end of the cap 15 to serve as an abutment or stop for the upper end of the valve stem to limit the upper movement thereof.

The chamber 11 is provided with an outlet port 36, which, in the form of my invention illustrated, leads into the chamber 12, the latter being provided with outlet ports 37 and an outlet pipe 38. It may be assumed that the outlet port 37 leads to the atmosphere so as to serve as a vent port, while the outlet port 38 will lead to the bladders or inflatable members in the aviator's suit. The valve port 37 may be controlled by a valve 39 formed at the lower end of a valve stem 40 extending upwardly through the partition 14 and held in adjusted position by an adjusting screw 41 provided at the top of the cap 16. That is to say, the valve port 37 may be closed entirely or may be opened to any desired extent by means of the adjusting screw 41, so that all or any desired part of the air under pressure which is admitted into the chamber 12 through the port 36 may be led to the aviator's suit through the pipe 38 or exhausted to the atmosphere. Normally, however, it will only be necessary to use a part of the compressed air admitted to the chamber 12 for the inflation of the aviator's suit, so that the valve 39 will normally stand in a partially open position and, in such position, will vent the air from the aviator's suit as soon as the admission of compressed air into the chamber 12 through the port 36 has ceased.

The operation of this form of my invention is as follows: It will be assumed that compressed air is admitted to the chamber 18 through the tube 22, which is in communication with a source of air under pressure. The valve stem 26 will normally stand in the position shown in Fig. 1, the tension of the spring 33 being just sufficient to overcome the force of gravity upon the weight 31, so that the valve port 19 will be closed and the valve port 20 will be opened, thus permitting this compressed air to pass out through the tube 21 to the gas tank or other place of delivery.

When, however, the weight 31 is subjected to the action of centrifugal force, as it will be, for example, when an aviator brings his plane out of a dive, the effect of this force on the weight 31 will cause the valve stem 26 to move downwardly, carrying with it the valve 25. When the valve 25 reaches a position adjacent its seat on the port 20 and restricts the effective opening of this port, the action of the compressed air above and around this valve will cause it to snap downwardly upon its seat with a snap action to fully closed position. At this time the abutment 29 will engage the upper surface of valve 24 and move it downwardly to open position against the action of the spring 27. There is in effect, a lost-motion connection between the valves 24 and 25, so that the former will not be moved from its seat until the latter is nearly closed and, likewise, upon reverse movement, permit a movement of valve 25 to a more fully opened position after valve 24 has been seated.

When the parts have been moved as described to the position shown in Fig. 2 by the action of centrifugal force, in which position the port 20 is closed and the port 19 is opened, the compressed air will pass into the chamber 11 and out through the port 36 into the chamber 12 and through the pipe 38 to the suit of the aviator. If the valve 39 is in partially opened position, as it probably will be, a part of the air will be vented to the atmosphere. The suit or the bladders contained within the suit will then be properly and automatically inflated under the control of centrifugal force.

When the pull upon the weight 31 due to centrifugal force has ceased, as it will when normal flying is resumed, the spring 33 will move the valve stem upwardly from the position shown in Fig. 2 to that shown in Fig. 1, thus restoring the parts to their normal positions. The air in the chambers 11 and 12 and in the aviator's suit will now be vented or exhausted through the port 37, so that no pressure will remain in the suit, it being assumed that valve 39 stands in partially open position. As the valve 24 is now closed, the compressed air admitted to the chamber 18 will pass through the port 20 to again pressurize the gas tank.

Figure 3:
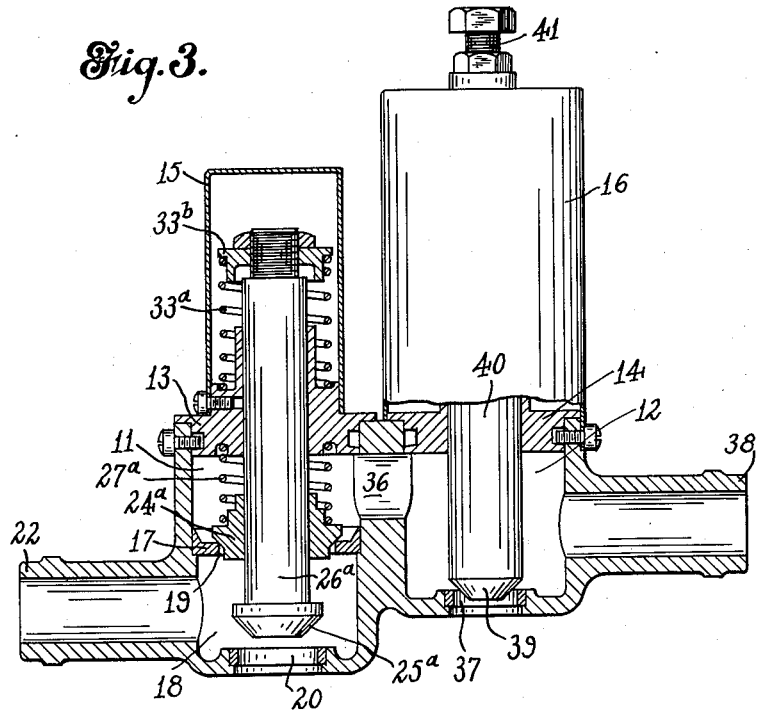
Fig. 3 is a sectional view similar to Fig. 1 of a modified form of my invention.
Figure 4:
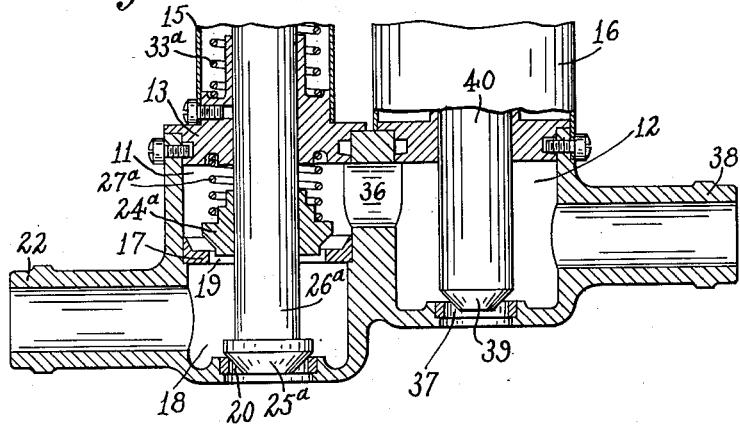
Fig. 4 is a view similar to Fig. 3 showing the valves in another position.

In Figs. 3 and 4 of the drawings I have shown a slightly modified form of my invention in which the valve 24ª is mounted above the port 19 in the partition 17 and is held against its seat by a compression spring 27ª acting at its lower end against the valve and at its upper end against the partition 13. A valve 25ª controls the port 20 which, in his instance, may be assumed to lead directly to the atmosphere so as to vent the chamber 18. The stem 26ª extends snugly but slidably through the valve 24ª and is urged by the spring 33ª in a direction to move the valve 25ª away from its seat. The spring 33ª acts at its upper end against an abutment 33ᵇ secured adjustably to the upper end of the stem 26ª. It will be understood that the remaining parts of the modification of my invention shown in Figs. 3 and 4 are the same as the correspondingly numbered parts shown in Figs. 1 and 2.

It will be apparent that in this form of my invention the valve 24ª is not positively actuated but operates in the manner of a pressure relief valve in that it is urged against its seat by the spring 27ª and is opened when the pressure in the chamber 18 overcomes the tension of the spring. It will be also understood that the port 20 in this form of my invention is larger than the effective area of the pipe 22, so that under normal conditions, the air under pressure entering through pipe 22 will be vented through the port 20 so that no pressure will be built up in chamber 18 to tend to open the valve 19.

The operation of my device is as follows: With the parts in position shown in Fig. 3, it will be understood that the pipe 22 is in communication with a source of fluid pressure such as air under pressure, for example, and that this air will be vented from the chamber 18 through the port 20 and will be prevented by the valve 24ᵃ controlling the port 19 from passing into the chamber 12 and thus to the aviator's suit. However, when the structure is subjected to the action of centrifugal force, the effect of this force on the weight of the valve stem 26ᵃ and associated parts will serve to close the valve 25ᵃ upon the port 20, thus subjecting the valve 24ᵃ to the pressure of the air admitted to chamber 18. The pressure of this air behind or below the valve 24ᵃ will cause the latter to be opened against the pressure of the spring 27ᵃ, thus admitting compressed air to the chamber 12 and thence to the aviator's suit through the pipe 38, the valve 39 acting as before to exhaust or vent a part of this air to the atmosphere, assuming that the valve 39 is in partially opened position.

When, however, the action of centrifugal force has ceased, the spring 33ᵃ will again lift the valve 25ᵃ from its seat and thus vent chamber 18 to the atmosphere and permit the spring 27ᵃ to again seat the valve 24ᵃ, thus cutting off communication between the chambers 18 and 11 and cutting off delivery of any further air pressure to the aviator's suit. The air in the suit will now be exhausted or vented through the port 37 around the valve 39, as previously described in the modification of my invention shown in Figs. 1 and 2.

It will be obvious that in both forms of my invention, I have provided a controlling valve responsive to the action of centrifugal force which will automatically control the admission of fluid pressure to a point of delivery such, for example, as an aviator's suit, and also to a second point of delivery such, for example, as the gas tank of an airplane when it is desired to place such tank under pressure. While I have shown and described some preferred embodiments of my invention, it will be understood that it is not to be limited to all of the details shown, but is capable of modification and variation within the spirit of the invention and within the scope of the claims.

What I claim is:
1. Means for inflating the bladder of an aviator's suit, or the like, comprising a valve casing having a chamber provided with an inlet port and a pair of aligned outlet ports, a valve stem slidably mounted in the casing and extending into the chamber through one of said ports, a valve carried by said stem to control the other of said ports, a second valve slidably mounted on said stem and controlling said first port, a spring urging said slidably mounted valve along the stem toward said first port, a weighted member on the stem tending to move said first-named valve member toward the other of said ports under the action of centrifugal force, and an abutment on the stem engaging said slidably mounted valve member to move the latter away from its seat against the action of said spring.

2. Means for inflating the bladder of an aviator's suit, or the like, comprising a valve casing having a chamber provided with an inlet port and a pair of aligned outlet ports, a valve stem slidably mounted in the casing and extending into the chamber through one of said ports, a valve carried by said stem to control the other of said ports, a second valve slidably mounted on said stem and controlling said first port, a spring urging said slidably mounted valve along the stem toward said first port, a weighted member on the stem tending to move said first-named valve member toward the other of said ports under the action of centrifugal force, and an abutment on the stem engaging said slidably mounted valve member to move the latter away from its seat against the action of said spring, and a second spring acting on said stem in opposition to said weighted member.

3. Means for inflating the bladder of an aviator's suit, or the like, comprising a valve casing having a chamber provided with an inlet port and a pair of aligned outlet ports, a valve stem slidably mounted in the casing and extending into the chamber through one of said ports, a valve carried by said stem to control the other of said ports, a second valve slidably mounted on said stem and controlling said first port, a spring urging said slidably mounted valve along the stem toward said first port, a weighted member on the stem tending to move said first-named valve member toward the other of said ports under the action of centrifugal force, a duct connected to one of said ports adapted to convey fluid from the chamber to the bladder.

4. Means for inflating the bladder of an aviator's suit, or the like, comprising a valve casing having a chamber provided with an inlet port and a pair of aligned outlet ports, a valve stem slidably mounted in the casing and extending into the chamber through one of said ports, a valve carried by said stem to control the other of said ports, a second valve slidably mounted on said stem and controlling said first port, a spring urging said slidably mounted valve along the stem toward said first port, a weighted member on the stem tending to move said first-named valve member toward the other of said ports under the action of centrifugal force, a second chamber in communication with the first chamber through one of said ports, a duct leading from said second chamber adapted to convey fluid to the bladder.

IRVING R. VERSOY.

REFERENCES CITED

The following references are of record in the file of this patent:

UNITED STATES PATENTS

| Number | Name | Date |
|---|---|---|
| 529,739 | Long | Nov. 27, 1894 |
| 616,197 | Moller | Dec. 20, 1898 |
| 876,274 | Kintner | Jan. 7, 1908 |
| 1,297,193 | Levinsen | Mar. 11, 1919 |
| 2,152,084 | Paine | Mar. 28, 1939 |
| 2,159,785 | Down | May 23, 1939 |
| 2,163,731 | Hallot | June 27, 1939 |
| 2,222,886 | Voigt | Nov. 26, 1940 |

FOREIGN PATENTS

| Number | Country | Date |
|---|---|---|
| 31,552 | Norway | of 1921 |
| 640,848 | Germany | of 1937 |